Patented Nov. 9, 1926.

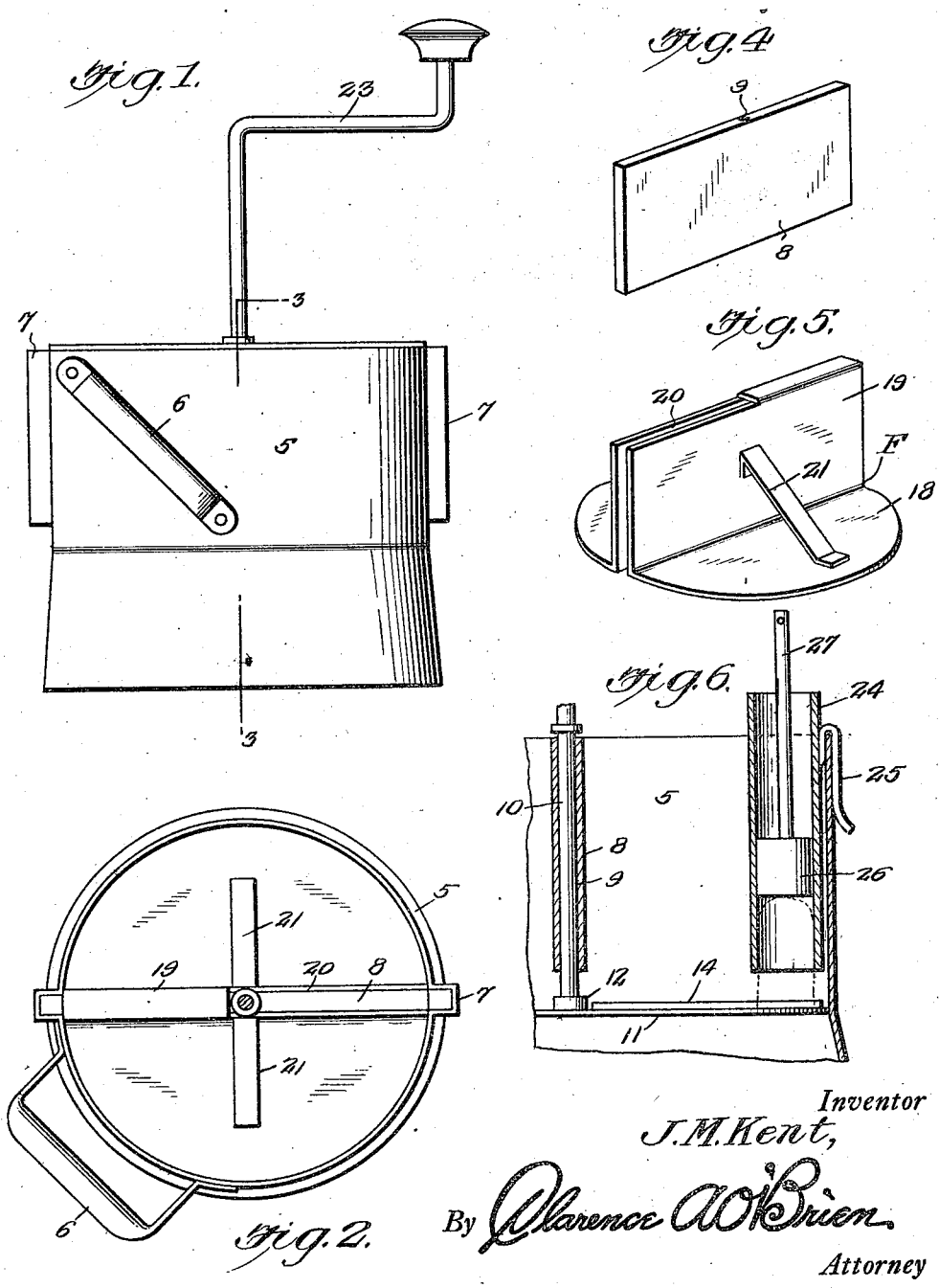

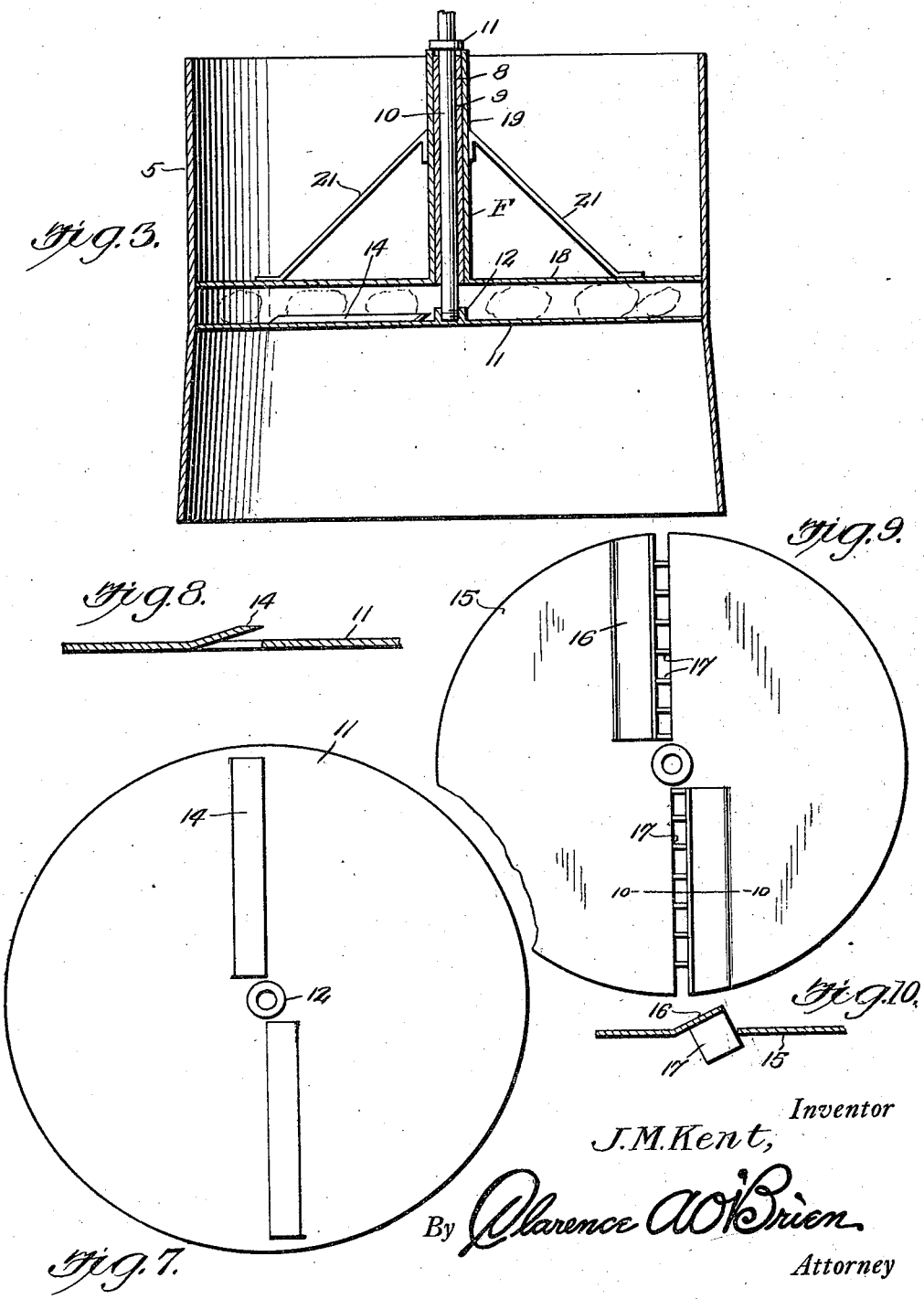

1,606,302

UNITED STATES PATENT OFFICE.

JAMES M. KENT, OF ELECTRA, TEXAS.

VEGETABLE CUTTER.

Application filed March 29, 1926. Serial No. 98,256.

The present invention relates to vegetable cutters and has for its principal object to provide a structure having the advantages of superior compactness, superior convenience, durability, ease of assembly and disassembly, superior accessibility, superior efficiency and reliability, easy of operation, a structure which is not likely to easily become out of order, and is otherwise well adapted to the purpose for which it is designed.

With the above and other objects in view as will appear as the description proceeds, the invention resides in certain novel features of construction, and in the combination and arrangement of parts as will be hereinafter more fully described and claimed.

In the drawing:—

Figure 1 is a side elevation of the vegetable cutter embodying the features of my invention, Fig. 2 is a top plan view thereof with the crank shaft in section, Fig. 3 is a vertical section taken substantially on the line 3—3 of Fig. 1, Fig. 4 is a perspective view of the cross member, Fig. 5 is a perspective view of the follower, Fig. 6 is a vertical section through the device showing a modified form of the follower, Fig. 7 is a plan view of the knife, Fig. 8 is a fragmentary section therethrough, Fig. 9 is a plan view of another embodiment of the knife, and Fig. 10 is a detail section therethrough taken substantially on the line 10—10 of Fig. 9.

Referring to the drawing in detail, it will be seen that 5 designates a casing, the upper portion of which is cylindrical and the lower portion frusto-conical in formation. A U-shaped handle 6 is diagonally disposed on the exterior surface of the cylindrical portion of the casing 5. The cylindrical portion of the casing 5 is provided at diametrically opposed points with pockets 7 extending parallel with the axis of the casing.

A cross member, in the form of a sort of partition, is designated by the numeral 8 and is adapted to be disposed in the casing 5 with its ends positioned in the pockets 7. A bearing 9 extends transversely, that is vertically, through the center of the cross member 8 for the reception of a shaft 10 journaled therein. A thrust collar 11 is fixed to the shaft 10 for engaging the upper edge of the cross member 8. The shaft 10 extends below the cross member 8 as is clearly seen in Fig. 3, and has a circular blade 11 detachably engaged thereon, by means of an annular internally threaded flange 12 engaging the threads on the lower terminal of the shaft 10.

The blade is adapted to be disposed at the juncture of the cylindrical portion with the frusto-conical portion of the casing 5 as is also apparent from Fig. 3. The blade 11 is provided with struck up sharpened portions 14, the sharpened edges extending radially of the blade. Another embodiment of the blade is denoted by the numeral 15 which is provided with upstruck cutting portions 16, each of which is provided with a plurality of depending teeth 17 for the purpose of severing the pieces cut by the portions 16 into several parts.

A follower is indicated generally by the letter F which includes a pair of segmental plates 18 connected by a U-shaped portion 19, the bight of which is partially cut away to provide the slots 20. The U-shaped portion 19 is braced in respect to the plate 18 by members 21. This follower is adapted to be placed in the casing so that the sides of the U-shaped portion 19 straddle the cross piece 8. This follower is placed in the casing after vegetables have been disposed on the blade 11. The follower is prevented from turning because of the engagement of the U-shaped portion 19 with the cross piece 8. The blade 11 may be turned by the crank 23 forming an integral part with the shaft 10. Thus the vegetables will be sliced by the cutting portions 14 as the blade revolves, and the follower will press down on the vegetables, holding them against movement and in proper position to be sliced by the blade, as will be quite apparent.

In Fig. 6 I have shown another embodiment of the follower mechanism, particularly useful for a single vegetable. Referring in detail to this vegetable, it will be seen that 24 designates a tube supported in the casing 5 by means of an inverted U-shaped bracket 25 secured to the tube and adapted to straddle the upper edge of the casing. A follower plunger 26 is slidable in the tube 24 and has a rod 27 rising therefrom. The operation of this embodiment is quite apparent.

Particular emphasis is laid upon the superior compactness and convenience of this device, and especially the ease with which the parts thereof may be assembled and disassembled, thereby lending to the device superior accessibility for sanitary reasons and the like.

It is thought that the construction, operation, utility, and advantages of the invention will now be clearly understood without a more detailed description thereof. The present embodiment of the invention has been disclosed in detail, merely by way of example, since in actual practice it obtains the features of advantage enumerated as desirable in the statement of the invention and the above description.

It is apparent that changes in the details of construction, and in the combination and arrangement of parts may be resorted to without departing from the spirit or scope of the invention as hereinafter claimed, or sacrificing any of its advantages.

Having thus described my invention, what I claim as new is:—

1. A vegetable cutter of the class described including, in combination, a casing, a cross piece removably mounted in the casing, a shaft journaled through the cross piece, a blade on the inner end of the shaft, a follower in the casing having a U-shaped portion for engaging the cross piece to prevent turning of the follower.

2. A vegetable cutter of the class described including a casing, said casing provided at diametrically opposite points with pockets, a cross piece in the casing having its ends removably mounted in the pockets, a shaft journaled centrally through the cross piece co-axially with the casing, a cutting element on the inner end of the shaft and detachably engaged therewith, a follower comprising a pair of segmental plates and a U-shaped portion connecting the plates, the bight of the U-shaped portion provided with an elongated slot, whereby the U-shaped portion may be placed over the cross piece, the shaft extending through the slot.

In testimony whereof I affix my signature.

JAMES M. KENT.